United States Patent
Petek (10) Patent No.: US 7,723,888 B2
(45) Date of Patent: May 25, 2010

(54) SYNCHRONOUS ELECTROMECHANICAL TRANSFORMER

(76) Inventor: Marko Petek, Metava 53, 2229, Malecnik (SI)

( * ) Notice: Subject to any disclaimer, the term of this patent is extended or adjusted under 35 U.S.C. 154(b) by 457 days.

(21) Appl. No.: 11/911,830

(22) PCT Filed: May 23, 2005

(86) PCT No.: PCT/SI2005/000015

§ 371 (c)(1),
(2), (4) Date: Oct. 18, 2007

(87) PCT Pub. No.: WO2005/117243

PCT Pub. Date: Dec. 8, 2005

(65) Prior Publication Data

US 2008/0169720 A1 Jul. 17, 2008

(30) Foreign Application Priority Data

May 25, 2004 (SI) .............................. P-200400151

(51) Int. Cl.
*H02K 16/04* (2006.01)
*H02K 1/14* (2006.01)
*H02K 21/12* (2006.01)

(52) U.S. Cl. .................. 310/156.35; 310/266; 310/184; 310/185; 310/112; 310/162

(58) Field of Classification Search ................ 310/112, 310/113, 156.01, 184, 185, 266, 156.35
See application file for complete search history.

(56) References Cited

U.S. PATENT DOCUMENTS 4,532,447 A * 7/1985 Cibie ......................... 310/114

(Continued)

FOREIGN PATENT DOCUMENTS

CA 2444759 A1 4/2004

(Continued)

OTHER PUBLICATIONS

Bianchi, N. et al., "Design Techniques for Reducing the Cogging Torque in Surface-Mounted PM Motors," IEEE Transactions on Industry Applications, IEEE Inc. New York, US, vol. 38, No. 5, Sep. 2002, pp. 1259-1265, XPOOI132462.

(Continued)

*Primary Examiner*—Burton Mullins
(74) *Attorney, Agent, or Firm*—Louis Ventre, Jr.

(57) ABSTRACT

The invention relates to a synchronous electromechanical transformer that can be used as a multi-phase motor and generator, has a high specific torque, a small or negligible stop moment, a small moment irregularity, can be quietly operated, and has good heat permeability between the windings and the housing. It contains a rotor having uniformly distributed magnetic poles (4), and two stators (2) with concentrated windings (8) of at least two electrical phases. The individual stator contains the same number of similarly arranged electromagnetic poles (9) of each of at least two electrical phases arranged in related groups (7) of at least two electromagnetic poles of the same electric phase. The stator poles (9) can contain magnetically permeable polar cores and can be uniformly or non-uniformly distributed. The number of electromagnetic poles of the stator differs from that of the rotor by the product between the number of stator groups (7), the electromagnetic poles of said stator groups pertaining to the same electrical phases, and a natural number that is not a multiple of the number of electrical phases. A radial, axial and linear embodiment of the transformer is possible.

10 Claims, 6 Drawing Sheets

U.S. PATENT DOCUMENTS

| | | | |
|---|---|---|---|
| 4,757,220 A * | 7/1988 | Pouillange | 310/49.53 |
| 5,006,745 A | 4/1991 | Nishio et al. | |
| 5,212,419 A | 5/1993 | Fisher et al. | |
| 5,345,133 A * | 9/1994 | Satake | 310/266 |
| 5,744,895 A * | 4/1998 | Seguchi et al. | 310/266 |
| 5,751,089 A | 5/1998 | Stridsberg | |
| 5,783,893 A * | 7/1998 | Dade et al. | 310/266 |
| 5,986,376 A | 11/1999 | Werson | |
| 6,459,185 B1 * | 10/2002 | Ehrhart et al. | 310/156.45 |
| 6,664,692 B1 | 12/2003 | Kristoffersen | |
| 6,737,778 B2 * | 5/2004 | Daikoku et al. | 310/112 |
| 6,819,026 B2 * | 11/2004 | Narita et al. | 310/266 |
| 2008/0203848 A1 * | 8/2008 | Nymann et al. | 310/268 |

FOREIGN PATENT DOCUMENTS

| | | |
|---|---|---|
| CA | 2341272 C | 7/2007 |
| DE | 3609351 A1 | 9/1987 |
| DE | 19856647 A1 | 6/2000 |
| DE | 10019801 A1 | 1/2002 |
| DE | 10049883 A1 | 4/2002 |
| DE | 10322018 A1 | 10/2004 |
| EP | 0094978 A1 | 11/1983 |
| EP | 0216202 A1 | 4/1987 |
| EP | 0291219 A2 | 11/1988 |
| EP | 0295718 A2 | 12/1988 |
| EP | 0454183 A1 | 10/1991 |
| EP | WO2004006415 A1 | 1/2004 |
| JP | 2002335658 B1 | 11/2002 |
| JP | 2003139156 B1 | 5/2003 |
| JP | 2004200554 B1 | 7/2004 |
| JP | 2004289759 B1 | 10/2004 |
| WO | WO03103114 A1 | 12/2003 |

OTHER PUBLICATIONS

Zhu, Z. Q., et al. "Influence of Design Parameters on Cogging Torque in Permanent Magnet Machines," IEEE Transactions on Energy Conversion, IEEE Inc. New York, US, vol. 15, No. 4, Dec. 1, 2000, pp. 407-412, XP002206342, ISSN: 0885-8969.

* cited by examiner

SYNCHRONOUS ELECTROMECHANICAL TRANSFORMER

TECHNICAL FIELD

The invention relates to a synchronous electromechanical transformer. According to the international patent classification, it can be categorized in H02K16/04, H02K21/12, H02K26 and H02K1/06.

The invention solves the problem of designing a multiphase synchronous electromechanical transformer comprising concentrated windings, the transformer having high torque, very small or negligible cogging torque, small moment irregularity, minimized moment of inertia, few vibrations and excellent thermal transmission between the windings and the housing.

STATE OF THE ART

According to most known solutions, the electromagnetic poles comprise permeable pole cores. So as to achieve minimized cogging, the number of electromagnetic poles differs from the number of magnetic poles. With respect to the design of the electromagnetic part, the solutions can be divided into three groups. The first group comprises solutions with one rotor and one stator each, which are described in the patent documents EP0094978, EP0216202, EP0291219, EP0295718, DE10049883, WO2004006415, DE10322018 and the like, which disclose designs comprising approximately equally distributed electromagnetic poles, as well as in the patent document EP0454183, according to which the electromagnetic poles are distributed in sections in the same distance as the rotor poles. Compared to those solutions comprising two stators, the solutions comprising one stator have clearly worse thermal transmission between the stator windings and the housing, high mechanical bending loads of the rotor, greater rotor vibrations and worse utilization of the magnetic poles of the rotor. Due to the higher parasitic magnetic flux between adjoining electromagnetic poles, the solutions comprising one stator and one rotor have lower specific torque. In the second group, the solutions comprise two rotors and one stator. Some designs are described in WO03103114, U.S. Pat. No. 6,664,692 and the like. The embodiments comprising the stator between two rotors frequently exhibit less mechanical rigidity of the connection between the stator and the housing.

In the third group, the solutions comprise one rotor and two stators. Such an embodiment is described in the patent document CA2341272. The weakness of these solutions is their complex rotor structure, which is complex to produce. The patent document DE19856647 describes another embodiment, according to which the magnets are attached on a magnetic permeable rotor yoke. This embodiment is subject to additional energy losses in the rotor yoke, slightly lower specific torque and less than optimized utilization of the magnetic poles. The rotor and stator polecount has a ratio of 4:3, so that this embodiment produces moderate cogging torque and a smoothness of running. In cases with higher pole numbers the losses caused by the variable magnetic fields are higher than in cases in which the number of rotor poles differs only little from the number of stator poles. Phase coupling is high because the adjoining electromagnetic poles pertain to different electrical phases. The patent document CA2444759 describes an axial design in which the pole count ratio between the rotor and stator is 8:6, wherein the stators are angularly displaced relative to one another. This slightly reduces the cogging torque, the bending torque of the rotor, however, increases. The properties that are defined by the pole count ratio behave similarly as in the embodiment according to DE19856647. In the U.S. Pat. No. 5,751,089 a two-phase design comprising uniformly distributed stator and rotor poles, the number of the poles being equal, is described. The two stators are offset from one another by half a pole. This design has relatively high cogging torque. The same publication also describes a solution having an arbitrary even phase number, wherein the cogging torque can be reduced by increasing the phase number. This solution, however, is impractical because motor controls with four or more phases are not very common.

TECHNICAL SOLUTION

The invention proposes a design comprising two stators and one rotor, which is disposed between the two stators. With respect to the shape and the positions of the rotor and stators relative to each other, the design has a radial, axial and linear embodiment, respectively. In some embodiments, the electromagnetic poles comprise magnetic permeable pole cores.

A synchronous electromechanical transformer, also referred to as a motor, can be used as a multi-phase motor and generator. It uses electrical multi-phase systems in which the phase difference between adjoining pseudo-phases is 180°, divided by the phase number, which also comprises the normal three-phase system and the two-phase system with phases offset by 90°.

The electromagnetic part comprises two stators 2 and one rotor 1, which is disposed between the two stators and can be displaced in relation to the same. The stators are rigidly connected to the housing or are part of the housing. The rotor comprises approximately uniformly distributed magnetic poles 4 with alternate orientations. The magnetic poles are oriented approximately parallel to the direction that is disposed perpendicular to the adjoining surface with the magnetic gap between the magnetic poles and individual stator. The stator comprises poles 5 directed toward the rotor and one or more magnetically permeable parts 6, through which the magnetic flux between adjoining poles flows on the side that does not abut the magnetic gap with the rotor. The stator comprises the same number of uniformly disposed electromagnetic poles of each of at least two electrical phases, which are disposed in connected groups 7 of at least two electromagnetic poles, wherein all electromagnetic poles of the individual group pertain to the same electrical phase and the adjoining electromagnetic poles of the same group are electrically offset by 180°. The number of rotor poles that abut the magnetic gap with the individual stator (M) differs from the number of the electromagnetic poles of the stator (E) by the product between the number of stator groups whose electromagnetic poles pertain to the same phase (G) and a natural number (n) that is not a multiple of the number of electrical phases (F), M=E±nG. So as to match the average electrical phase to the average magnetic phase in the region of the individual stator group, the adjoining electromagnetic poles that pertain to different stator groups are electrically offset by 180°+sgn(M−E)(180°/F)n. The number n is preferably equal to one, because in this case the average absolute phase difference between the magnetic phase of the rotor and the electrical phase of the stator can be the lowest. The magnetic poles of the rotor can be better utilized with stators that comprise groups with larger numbers of electromagnetic poles. If the stator, in the case of a rotatory design, comprises more than one stator group of the individual phase, the overall center of gravity of the positions of electromagnetic poles that pertain to the same phase preferably agrees with the rotor axis. In the case of rotatory designs, the number of rotor poles that abut the magnetic gap with the individual stator (M) is an even number.

BRIEF DESCRIPTION OF THE DRAWINGS

The design will be explained in more detail with reference to some examples and figures, wherein.

DESCRIPTION OF THE INVENTION

The number of rotor poles abutting the magnetic gap with the individual stator (M) is equal on the two stators. Particularly those embodiments are advantageous, in which the individual rotor poles 4 abuts both magnetic gaps and the rotor, with the exception of the poles, comprises no magnetically permeable or electrically conductive parts. The energy losses in the rotor caused by the variable magnetic fields can be minimized in such cases. The utilization of the magnetic poles can be maximized because the magnetic potential difference required for producing the magnetic flux of the rotor poles is the smallest. The forces applied on the individual rotor pole that do not contribute to the output torque can be compensated for best in such cases. At the same time, also the torque acting on the individual rotor pole and causing bending stress in the rotor can be minimized.

Figure 2A:
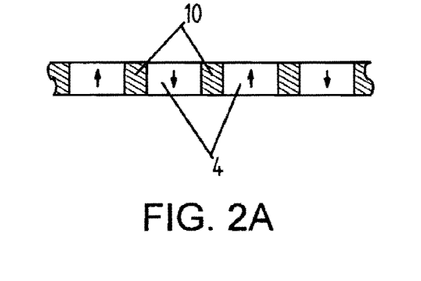
FIGS. 2A and 2B are two examples of the rotor embodiment.
Figure 2B:
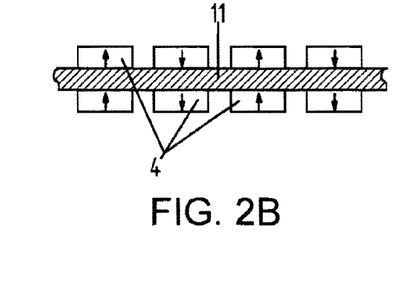

So as to increase mechanical rigidity and close the magnetic flux between adjoining rotor poles, in some embodiments the rotor is provided with a magnetically permeable yoke 11 to which the magnetic poles are attached from both sides. In general, the mass of the rotor is higher than in a rotor without yoke, which also results in a higher moment of inertia and greater thermal capacity. The utilization of the magnetic poles is slightly worse in these embodiments because the magnetic flux is closed on one side by the yoke. This circumstance, as well as the higher rotor mass, results in slightly lower specific torque, and due to the additional energy losses in the yoke also the energy losses in the rotor caused by the variable magnetic fields increase. The magnetic poles of the rotor are preferably distributed such that the positions of the poles on both sides of the yoke agree. In this way, the forces and torque that act on a section of the rotor and do not contribute to the output torque can be compensated for in the best manner. At the same time, it is preferred if balanced magnetic poles on both sides of the rotor have like orientations, allowing the magnetic poles to be better utilized and easier to be magnetized.

The magnetic poles can be inclined in relation to the electromagnetic poles in the direction of the rotor displacement, whereby smaller moment irregularity and a higher sinusoidality of induced voltage in the stator windings can be achieved, however the achievable torque decreases as the inclination increases. As the inclination increases also the cogging torque decreases in embodiments that comprise magnetically permeable stator poles. In some stator embodiments, reduced cogging torque can be achieved in that the position distance of the rotor poles is slightly varied periodically.

It is preferable if permanent magnets are used as the magnetic poles, wherein the maximum specific torque can be achieved with magnetic materials based on rare earths. Individual or multi-pole permanent magnets are used, which preferably have a rectangular shape or have the shape of identical segments. The magnets are generally best utilized if the portion they occupy amounts to seventy to eighty-five percent of the circumference of the surface that abuts the magnetic gap with the individual stator.

The rotor preferably comprises magnetic poles 4, which via the sides thereof not abutting the magnetic gap with the stators are connected to the elements 10 made of magnetically impermeable and electrically non-conductive material, preferably polymers or ceramics. The polymers are preferably reinforced by fillers, which improve the mechanical properties of the polymers as well as the rigidity of the rotor, thus contributing to a smoother operation. Fillers may also be used to improve the thermal properties of the rotor and adjust the coefficient of thermal expansion. The coefficient is preferably adjusted such that the ratio of the two magnetic gap widths is approximately maintained during temperature changes in the motor. The part of the rotor that comprises the magnetic poles is preferably connected to the shaft or the parts that serve the connection of the shaft by means of the same material. The rotor is preferably produced such that the magnetic poles are distributed accordingly and potted with binding material. It is preferable if also the connection to the shaft is produced at the same time. The magnets are generally completely potted, thus protecting them from corrosion and mechanical damage and also preventing crumbling. For good heat dissipation, it is important that the binding material layer on the magnetic pole surfaces abutting the magnetic gap enables excellent thermal transmission and good heat transfer.

The electromagnetic pole is associated with part of the winding 8 of the phase to which it pertains. It is preferable if every electromagnetic pole of the stator group has its own winding, which completely pertains to it, since such windings have the smallest dimensions and the lowest electric resistance and also enable the highest space factors and maximum thermal transmission between the windings and the housing. The winding of the stator group may also be configured such that the centers of the windings pertaining to the individual electromagnetic pole of the group only agree with the position thereof in every other electromagnetic pole. In such cases, the stator group preferably comprises an even number of electromagnetic poles. The winding of the stator group may also be configured as a meander winding, wherein the group preferably comprises an even number of electromagnetic poles.

Figure 1:
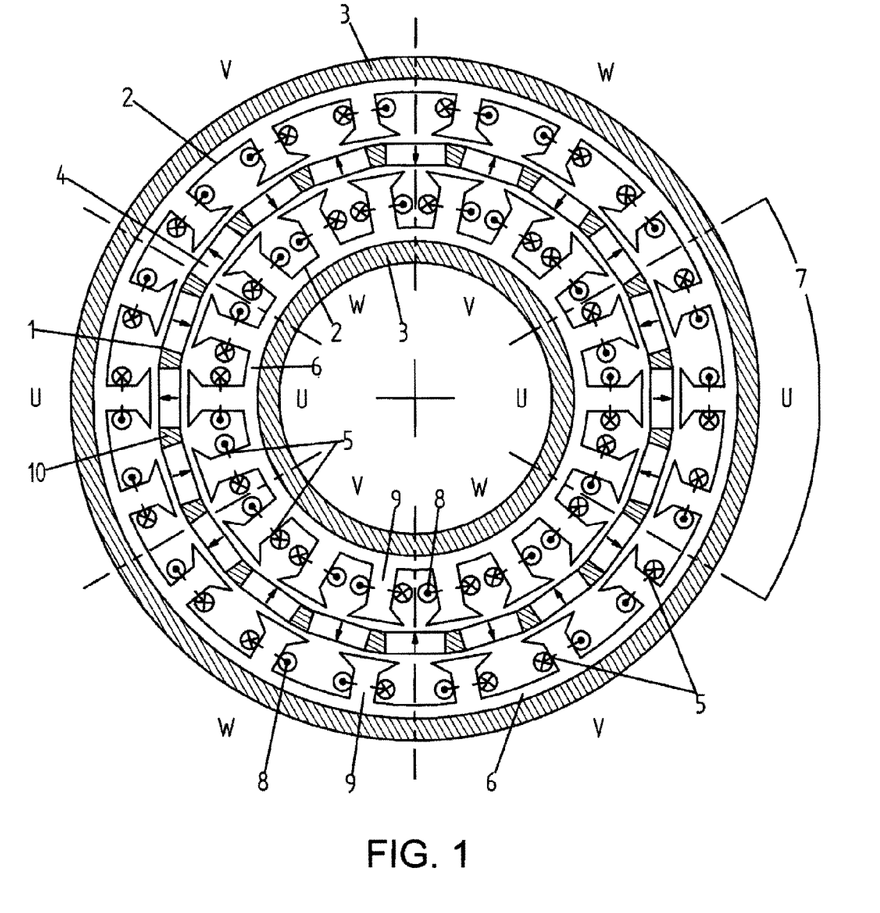
FIG. 1 is a three-phase radial embodiment, wherein each stator comprises 18 uniformly distributed electromagnetic poles with magnetically permeable pole cores and the rotor comprises 20 magnetic poles.

The stator poles can be uniformly distributed. With such a distribution, the position distance of adjoining electromagnetic poles of the same stator group is identical to that of the adjoining electromagnetic poles that pertain to different stator groups. The deviation between the magnetic phase of the rotor and electrical phase of the stator steadily increases toward the transitions between the stator groups. The phase difference between the magnetic and electrical phases is different for every electromagnetic pole of the stator group, so that it is preferred if the windings of all electromagnetic poles of the individual stator group are connected in series, thus preventing equalizing currents between individual electromagnetic poles and achieving a higher sinusoidality of the induced voltage in the windings. One example of such an embodiment is shown in FIG. 1.

Figure 3:
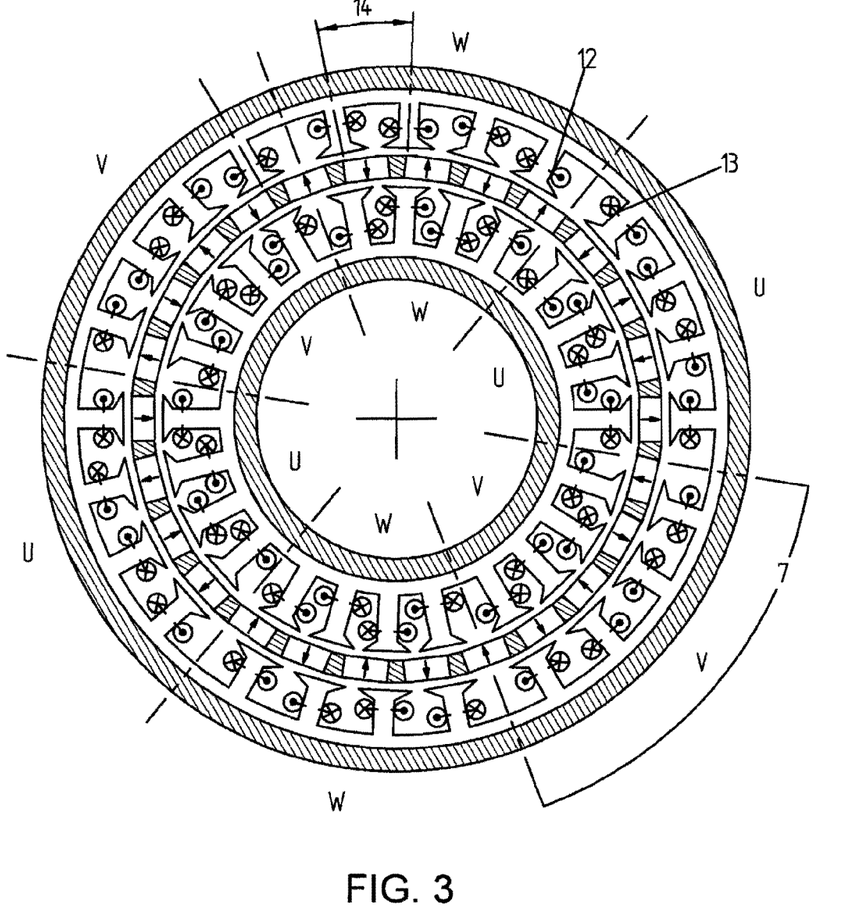
FIG. 3 is a three-phase radial embodiment, wherein each stator comprises 24 electromagnetic poles with magnetically permeable pole cores, which are distributed in sections in the same distance as the rotor poles, and the rotor comprises 26 magnetic poles.

If the number of rotor poles abutting the magnetic gap with the individual stator (M) is greater than the number of the electromagnetic poles of the stator (E), the electromagnetic poles can be distributed such that the position distance of adjoining electromagnetic poles pertaining to the same stator group 14 is equal to the average position distance of the rotor poles and is smaller than the position distance of adjoining electromagnetic poles pertaining to different stator groups 12, 13. Such an embodiment is shown in FIG. 3. Due to a minimized average absolute phase difference between the magnetic phase of the rotor and the electrical phase of the stator, such stator embodiments enable maximum specific torque. If the stator comprises electromagnetic poles with magnetically permeable pole cores, such a stator embodiment has greater cogging torque and a more trapezoidal progression of the induced voltage in the winding than a stator embodiment with uniformly distributed electromagnetic poles. Both can be partially reduced by periodically varying the position distance of the rotor poles. The period of variation is preferably identical to the number of rotor poles.

If the number of rotor poles abutting the magnetic gap with the individual stator (M) is greater than the number of the electromagnetic poles of the stator (E), and if the number n is greater than one, the electromagnetic poles of the individual stator group can be uniformly distributed such that the number of rotor poles facing them is by one third of the rotor pole larger than the number of the electromagnetic poles of the stator group. The position distance of adjoining electromagnetic poles pertaining to different stator groups is larger by $(n-1)/F$ of the average position distance of the rotor poles than the position distance of adjoining electromagnetic poles pertaining to the same stator group. Due to a smaller average absolute phase difference between the magnetic phase of the rotor and the electrical phase of the stator, such stator embodiments enable higher specific torque than those with uniformly distributed electromagnetic poles, although the cogging torque in both is comparable.

With respect to the magnetic properties of the stator poles, the stator has two variants. In the first variant, the stator poles comprise magnetically permeable pole cores 9. The pole cores are separated from the rotor poles by a magnetic gap, which is narrow compared to the dimension of the rotor pole in the direction of the rotor displacement and is preferably the same for all stator poles. The pole cores normally expand in the vicinity of the magnetic gap at least in one direction, which is positioned substantially perpendicular to the direction of the magnetic field in the magnetic gap, preferably in a parallel direction of the rotor displacement. As a result, the magnetic flux through the pole core increases, enabling better utilization of the core material and the conductors. At the same time, the demagnetization forces and variable magnetic fields in the rotor poles are reduced. The expanded pole core comprises a head 16 and a shaft 15, which preferably has parallel sides. The heads of the adjoining pole cores are preferably not in contact. The gap between adjoining heads is preferably larger than the width of the magnetic gap between the pole core and the rotor poles. In some embodiments, the magnetic gap width increases at the edges of the pole core, whereby the cogging torque and the portion of higher harmonic frequencies of the variable magnetic fields in the rotor poles decrease. The majority of the magnetic flux flows through the pole core. Variants comprising magnetically permeable pole cores are mainly characterized by higher specific torque, improved utilization of the magnetic poles of the rotor, smaller variable magnetic fields in the windings, better utilization of the conductors and generally also better thermal transmission between the windings and the housing.

Magnetically permeable pole cores preferably have high magnetic permeability, high saturation inductance, low magnetic reversal losses and low electrical conductivity. Pole cores are preferably made of mutually electrically insulated lamells made of magnetically permeable sheet metal or foil or of magnetically permeable particles cast in electrically non-conductive material or magnetically permeable ferrite. If the material of the pole cores has anisotropic magnetic properties, the direction with the ideal magnetic properties preferably agrees with the direction of the magnetic field in the core shaft 15.

Figure 4A:
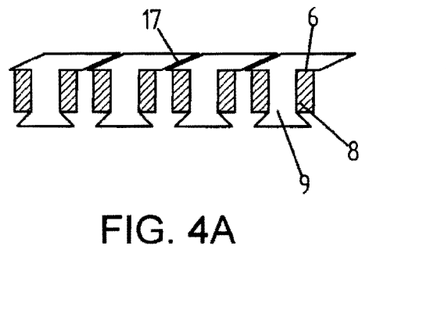
FIGS. 4A to 4F are the embodiments of the stators, which comprise magnetically permeable pole cores.
Figure 4B:
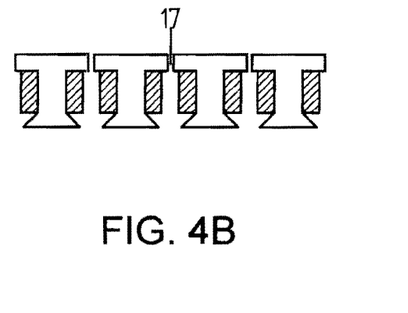
Figure 4C:
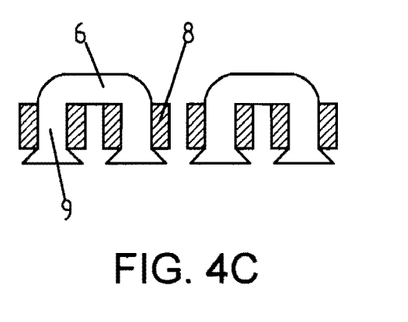
Figure 4D:
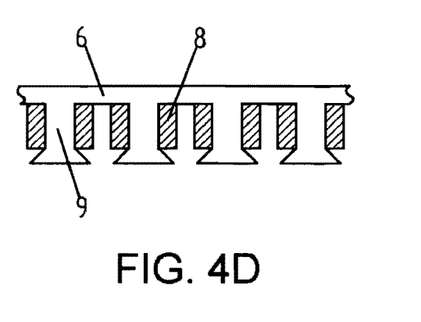
Figure 4E:
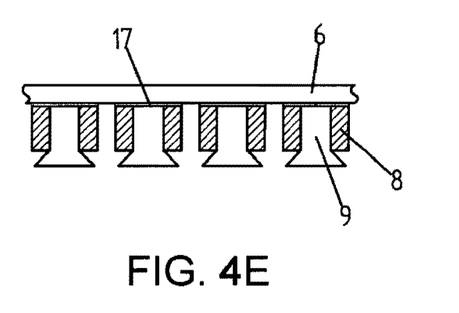
Figure 4F:
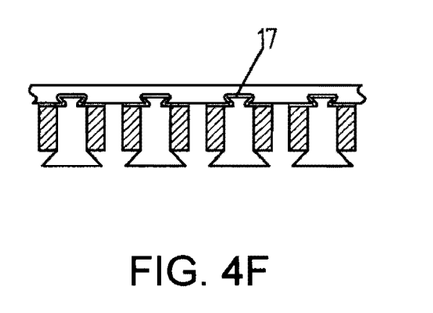

The pole cores 9 are preferably produced in one piece with the associated part of the magnetically permeable stator yoke 6, however they can also be produced as separate elements and attached to the stator yoke. The embodiments comprising a part of the stator yoke usually have better thermal transmission between the windings and the housing. FIGS. 4A to 4F represent several embodiments of the stators with magnetically permeable pole cores. In the embodiments of FIGS. 4A and 4B, the stator is made of elements comprising the pole core and part of the stator yoke, via which the magnetic flux between adjoining pole cores is closed. Electrically isolating gaps 17, which separate adjacent pole cores, are narrow, so that the magnetic voltage drop is small. As the gap region increases, the magnetic voltage drop at the gap 17 decreases, so that adjacent elements are preferably separated by oblique gaps, which is shown in FIG. 4A. The gaps are preferably filled with electrically non-conductive, thermally conductive binding agent, which electrically isolates the adjoining stator elements, increases the rigidity of the rotor and dampens acoustic vibrations. In the embodiments according to FIGS. 4C and 4D, the individual stator element comprises a plurality of pole cores and the part of the stator yoke that connects them. If in the embodiment according to FIG. 4C the two electromagnetic poles pertain to the same electrical phase, it has the smallest transformer coupling between the windings of different electrical phases. In the embodiments according to FIGS. 4E and 4F, pole cores are produced as separate elements and glued to the stator yoke or attached to the stator yoke with the help of pins and grooves. In the case of such embodiments, it is possible to produce the pole winding as a separate part, which is placed on the pole core when assembling the stator. With the exception of the embodiment according to FIG. 4D, the materials having anisotropic magnetic properties, for example grain-oriented electrical sheet, enable lower energy losses in magnetically permeable stator parts.

Figure 5A:
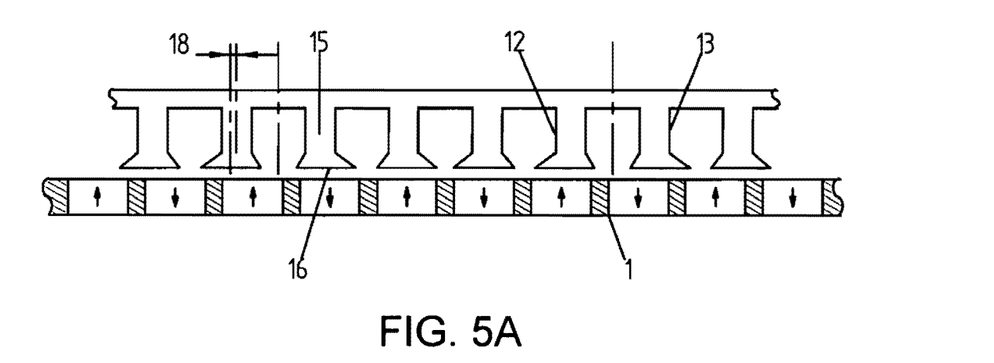
FIGS. 5A and 5B are the embodiments of magnetically permeable pole cores of the group of electromagnetic poles in which the shape of the pole core changes such that the difference between the magnetic phase of the rotor and the electrical phase of the stator is reduced.
Figure 5B:
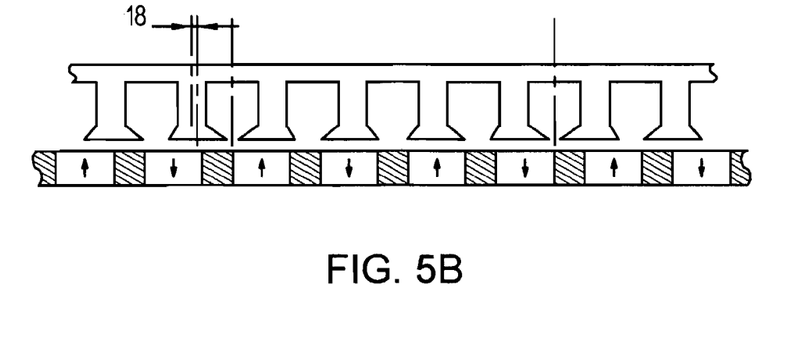
Figure 6A:
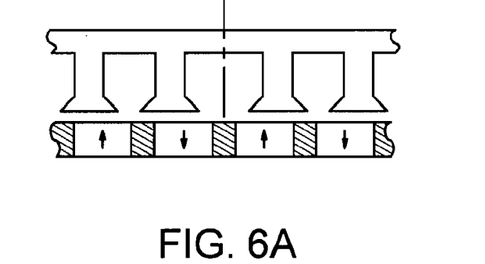
FIGS. 6A to 6E are transitions between adjoining stator groups comprising electromagnetic poles with magnetically permeable pole cores, wherein the distance between adjoining electromagnetic poles that pertain to different stator groups is larger than the distance of the adjoining electromagnetic poles of the same stator group.
Figure 6B:
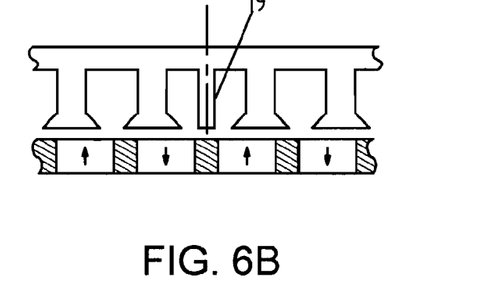
Figure 6C:
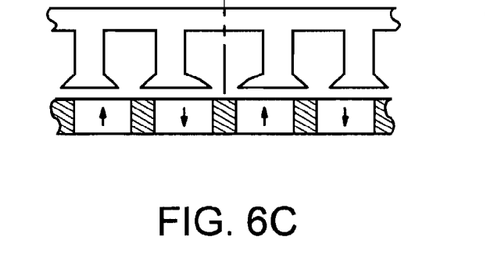
Figure 6D:
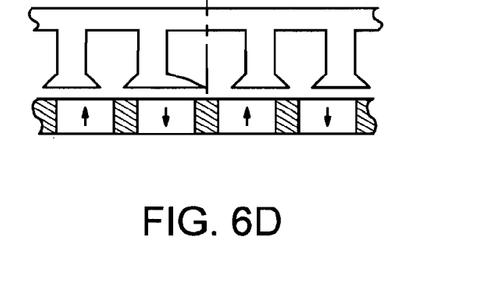
Figure 6E:
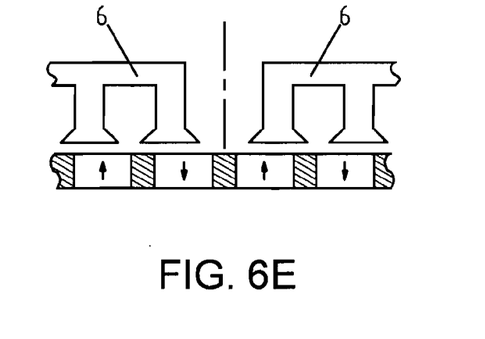

In stator embodiments in which the electromagnetic poles are uniformly distributed, the shape of the pole cores of an individual stator group can change such that the difference between the magnetic phase of the rotor and the electrical phase of the stator is reduced. As a result, specific torque increases, however at the same time also cogging torque increases. Generally, in the case of such embodiments electromagnetic poles provided more closely to the transitions between adjoining stator groups have asymmetrical pole core heads, which relative to the core shaft are also offset to a larger extent 18, which is shown in FIGS. 5A and 5B.

Stator embodiments, in which the distance between adjoining electromagnetic poles pertaining to different stator groups is larger than that between adjoining electromagnetic poles of the same stator group, may comprise poles 19 with magnetically permeable pole cores that do not pertain to any electrical phase and are provided between the stator groups. In this way, the variations of the magnetic field at the transitions between adjoining stator groups are reduced, which can also be achieved in that the pole core heads of adjoining electromagnetic poles pertaining to different stator groups 12, 13 are shaped such that the magnetic gap region with the rotor poles at the transitions between adjoining stator groups increases. A few examples of the transitions between adjoining stator groups are shown in FIGS. 6A to 6E.

Figure 7:
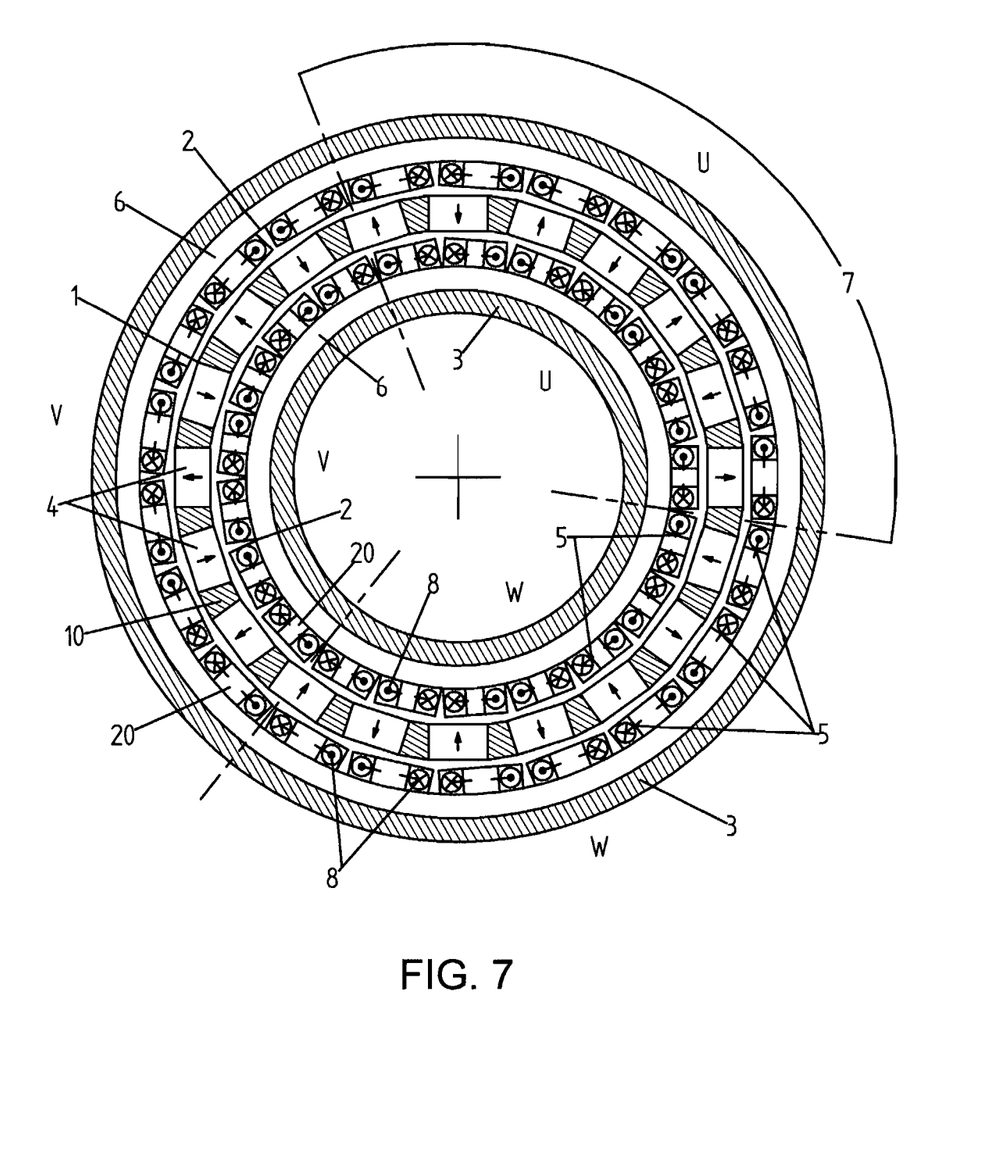
FIG. 7 is a three-phase radial embodiment, wherein each stator comprises 21 uniformly distributed electromagnetic poles without magnetically permeable pole cores and the rotor comprises 20 magnetic poles.
Figure 8:
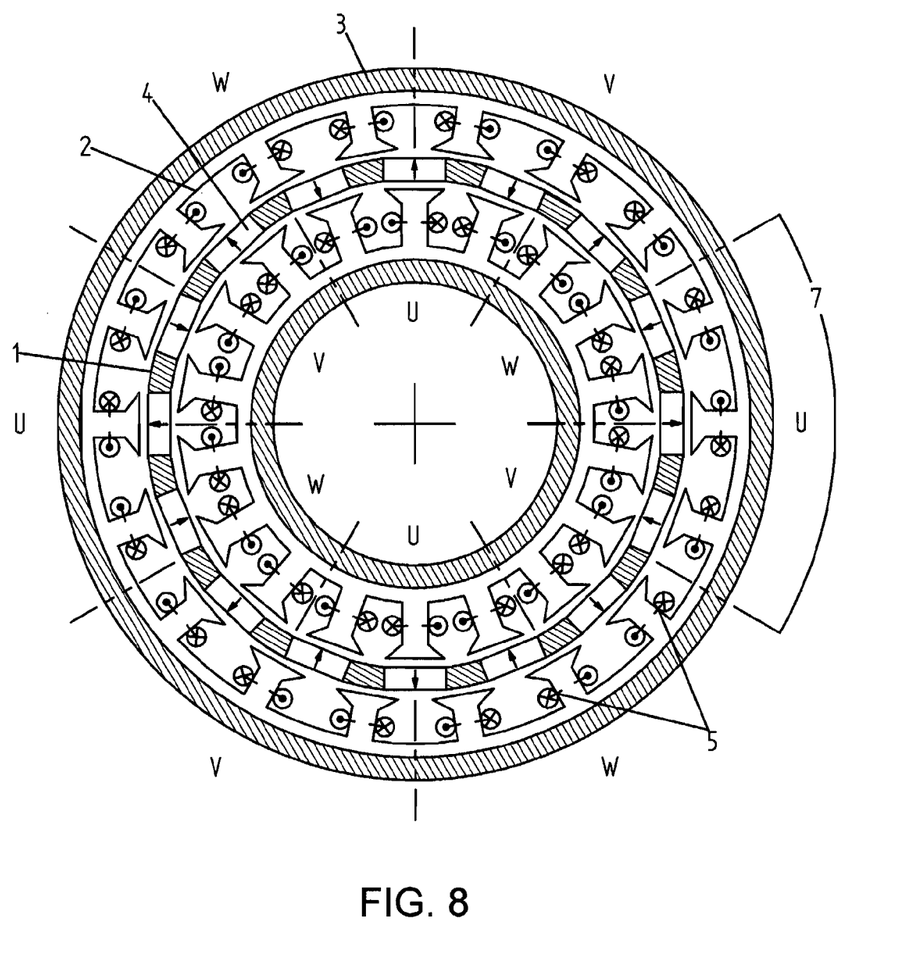
FIG. 8 is a three-phase radial configuration, wherein each stator comprises 18 uniformly distributed electromagnetic poles with magnetically permeable pole cores and the rotor comprise 16 magnetic poles, and wherein the stators are rotatably displaced in relation to each other about 4 rotor poles.

In the second variant, all stator poles are electromagnetic poles as well and comprise no magnetically permeable parts. The electromagnetic pole may comprise a winding carrier 20, which is preferably made of electrically non-conductive material. A magnetic flux of the electromagnetic pole runs predominantly through the pole winding, which is provided mainly in the magnetic gap between the rotor and magnetically permeable stator yoke 6. For this reason, the windings are configured such that eddy-current losses are kept to a minimum. The second stator variant is mainly characterized by negligible cogging torque, the absence of magnetic reversal losses in the pole cores, small variable magnetic fields in the rotor poles and extremely easy pole production.

Due to improved utilization of the magnetic poles of the rotor, higher specific torque can be achieved using a smaller number of stator groups whose electromagnetic poles pertain to the same electrical phase (G). If the number of stator poles is larger, the magnetic flux of the individual electromagnetic pole decreases, so that the magnetically permeable stator yoke 6 can have a smaller diameter. The magnetic poles of the rotor are exposed to smaller demagnetization forces because the part of the winding pertaining to the individual electromagnetic pole is smaller. If the number of stator poles is higher, normally also thermal transmission between the windings and the housing increases. Since the number of rotor poles preferably differs only little from the number of stator poles, energy losses caused by variable magnetic fields are larger with a higher stator pole count, which is particularly true for the variants comprising magnetically permeable stator pole cores.

In stator variants with uniformly distributed poles comprising magnetically permeable pole cores, the cogging torque is proportional to the quotient of the number of stator groups whose electromagnetic poles pertain to the same electrical phase (G) and the number of the electromagnetic poles of the stator (E). In order to minimize the cogging torque, for this reason the stator should preferably comprise a large number of electromagnetic poles, which are distributed among few stator groups. In stators comprising magnetically permeable pole cores with more than one stator group of every electrical phase, the cogging torque may also be reduced by periodically varying the position distance of the rotor poles. The cogging torque may also be reduced by inclining the stator poles relative to the rotor poles in the direction of the rotor displacement, however this method is impractical for stators comprising individual poles.

The stator is preferably made of identical elements comprising one or more poles and the part by which the magnetic flux between adjoining poles is closed. In embodiments with a higher number of elements, low mechanical stress caused by temperature changes and in general low acoustic vibrations occur. The maximum winding space factors and winding densities can exist in stators comprising individual poles, wherein every pole is wound separately. In the case of separately wound poles, in general a larger conductor cross-section can be achieved for identical winding dimensions, improved thermal transmission of the winding and better heat transfer between the winding and the pole core. This results in improved thermal transmission between the windings and the housing. The magnetically permeable stator yoke 6 may be interrupted between the stator groups, thus achieving lower transformer coupling between the windings of individual phases, although this typically reduces specific torque and increases cogging torque at the same time. The stator or the elements thereof are glued or fastened by mechanical fastening elements to the housing in an electrically isolating manner. Contacts between the stator and the housing preferably exhibit excellent thermal transmission.

The number of stator groups of the individual stator whose electromagnetic poles pertain to the same electrical phase (G) is preferably equal to one or two. The pole count and the pole distribution are preferably the same in both stators. The electromagnetic poles of both stators are preferably electromagnetically equivalent. The stators are disposed in relation to the magnetic poles of the rotor such that the average phase of the winding of an individual electrical phase is approximately synchronous for both stators.

The winding of the individual phase preferably forms one or more partial windings connected in parallel. It is preferable if all electromagnetic poles of an individual stator group pertain to the same partial winding. The individual partial winding preferably comprises the same number of electromagnetic poles from both stators to fight the equalizing currents between the partial windings, particularly if the electromagnetic poles of the two stators are not magnetically equivalent. In the case of a rotatory embodiment of the stator comprising more than one stator group of the individual phase, it is preferable if the overall center of gravity of the pole positions of all electromagnetic poles pertaining to the same partial winding agrees with the rotor shaft. In this way, the bending stress of the rotor shaft can be kept to a minimum, even if a partial winding or an entire winding of a phase should fail.

If both stators have the same number of poles and pole distribution and if the positions of the magnetic poles of the rotor agree on both rotor sides, the design with respect to the offset of the electromagnetic poles of the first and second stators from each other can take on several variants. In the first variant, the stators are offset from each other in the direction of the rotor displacement by no more than G/(2E) of the position distance of the adjoining rotor poles. The individual partial winding preferably has the same number of opposing electromagnetic poles of the first and second stators. These variants are characterized by minimized mechanical bending stress of the rotor and a minimized exciter effect on the rotor poles causing natural vibrations of the rotor.

At the same time, the bending stress of the rotor shaft is kept small, even in the event that a partial winding or the entire winding of a phase should fail. For this reason, such design variants have the smoothest operation. If the stators are not offset from each other, maximum torque can be achieved. In stator variants comprising magnetically permeable pole cores in general a mutual offset of the stators by G/(2E) of the position distance of the adjoining rotor poles can reduce the cogging torque and higher sinusoidality of a voltage curve in the windings can be achieved.

In the second variant, the stators are offset from one another in the direction of the rotor displacement by an integer of the rotor poles, preferably by an integer of the rotor poles closest to the quotient M/(2G). If the stators are offset by an uneven number of the rotor poles, the polarity of the windings of one of the two stators is reversed. These design variants enable maximum specific torque because the demagnetization forces that are applied to the rotor poles are the smallest. A smaller amplitude of the variable magnetic field in the rotor poles and a smaller portion of the higher harmonic frequencies compared to the first variant enable lower energy losses in the rotor. However, the bending load of the rotor and the exciter forces that are applied to the rotor poles, these forces causing the natural vibrations of the rotor, are high compared to the first variant, as is the phase coupling between the windings. In stators comprising only one stator group of the individual phase, the rotor shaft is subject to high bending load in this variant. If the stator poles are uniformly distributed, the number of rotor poles and the number of stator poles are preferably selected such that the electromagnetic poles of both stators are offset by half the position distance of the adjoining stator poles. In this case, the demagnetization forces and the variable magnetic fields in the magnetic poles are the lowest.

In stator embodiments comprising magnetically permeable pole cores, wherein the electromagnetic poles are distributed in sections at the same position distance as the rotor poles, the cogging torque is the lowest if the stator poles are offset from one another by 1/(2F) of the average position distance of the adjoining rotor poles and the position distance of the rotor poles is periodically varied by ±1/(8F) of the average position distance of the adjoining rotor poles.

The housing of the motor is preferably made of metal. Aluminum and magnesium alloys are preferred. Channels for liquid or gaseous coolants may be integrated in the motor housing, wherein the channels preferably extend parallel to surfaces that connect the stators to the housing.

In the case of a radial configuration of the design, the magnetic poles are oriented in the radial direction with respect to the rotor shaft. The part of the rotor comprising the magnetic poles generally has a ring shape and is disposed radially between the two stators. In the case of an axial configuration of the design, the magnetic poles are oriented parallel to the rotor shaft. The part of the rotor comprising the magnetic poles generally has a disk shape. In the case of a linear configuration of the design, the magnetic poles are oriented perpendicular to the direction of the rotor displacement.

Compared to a design with only one stator, the design comprising two stators has a lower percentage of the parasitic magnetic flux closing between adjoining electromagnetic poles, resulting in improved utilization of the magnetic poles at higher torque. In general, two-stator designs enable higher specific torque than single-stator versions.

A small difference between the rotor pole count and the stator pole count ensures that the cogging torque and moment irregularity can be kept to a minimum, even in stators with magnetically permeable pole cores. For this reason, and due to excellent balancing of the mechanical forces, the above-described design runs very smoothly. In the two-stator design, the individual stator is subject to slightly lower mechanical load than in a single-stator design. The bending load of the rotor and rotor shaft can be considerably lower than in designs comprising only one stator.

Designs comprising two stators guarantee considerably higher thermal transmission between the windings and the housing than designs with similar capabilities but only one stator. Due to a higher electric resistance of the stator windings and a lower magnetic energy of the magnetic poles at higher temperatures, a temperature increase in the motor negatively affects the motor capabilities. Through improved heat dissipation, the temperature of the motor in the above design can be kept lower than in conventional designs comprising one stator, resulting in lighter-weight and more powerful motors, which are also suited as direct drive units for vehicles.

What is claimed is:

1. A synchronous electromechanical transformer, which has a radial, axial or linear design, comprises two stators and one rotor, which is disposed between the two stators and can be displaced relative thereto, the rotor comprising approximately uniformly distributed, alternately oriented magnetic poles, the stator comprising poles with or without magnetically permeable pole cores and one or more magnetically permeable parts by which the magnetic flux between adjoining poles is closed on the side that does not abut the magnetic gap, characterized in that the stator comprises an identical number of identically disposed electromagnetic poles of each of at least two electrical phases, which are provided in related groups of at least two electromagnetic poles, wherein all electromagnetic poles of the individual group pertain to the same electrical phase and the adjoining electromagnetic poles of the same group are electrically offset by 180°, the number of rotor poles that abut the magnetic gap with the individual stator (M) differing from the number of electromagnetic poles of the stator (E) by the product between the number of stator groups whose electromagnetic poles pertain to the same electrical phase (G) and a natural number (n) that is not a multiple of the number of electrical phases (F), M=E±nG, wherein the adjoining electromagnetic poles that pertain to different stator groups are electrically offset by 180°+sgn(M−E) (180°/F)n, the natural number n preferably being equal to one and the number of stator groups of the individual stator whose electromagnetic poles pertain to the same electrical phase (G) is preferably equal to one or two, wherein the number of rotor poles that abut the magnetic gap with the individual stator being the same in both stators and both stators have the same number of poles and pole distribution, the winding of an individual phase comprising one or more partial windings connected in parallel, wherein every partial winding comprises the same number of electromagnetic poles in both stators and all electromagnetic poles of the individual stator group pertain to the same partial winding, and wherein the stators are disposed in relation to the magnetic poles of the rotor such that the effects of the two stators are added.

2. The synchronous electromechanical transformer according to claim 1, characterized in that the electromagnetic poles of the stator are uniformly distributed and the pole windings of the electromagnetic poles of the individual stator group are connected in series.

3. The synchronous electromechanical transformer according to claim 1, characterized in that the number of magnetic poles abutting the magnetic gap with the stator is larger than the number of electromagnetic poles of the stator (M>E) and that the electromagnetic poles are distributed such that the position distance of adjoining electromagnetic poles of the individual stator group is equal to the average position distance of the adjoining rotor poles.

4. The synchronous electromechanical transformer according to claim 1, characterized in that the electromagnetic poles of the stator comprise magnetically permeable pole cores and that between the stator groups magnetically permeable poles are disposed that pertain to no electrical phase.

5. The synchronous electromechanical transformer according to claim 1, characterized in that the stators are offset from one another in the direction of the rotor displacement by no more than G/(2E) of the position distance of the adjoining rotor poles, and that the pole windings of opposing electromagnetic poles of the first and second stators pertain to the same partial winding.

6. The synchronous electromechanical transformer according to claim 1, characterized in that the stators are offset from one another in the direction of the rotor displacement by an integer of the rotor poles, preferably by the integer of the rotor poles closest to the quotient M/(2G).

7. The synchronous electromechanical transformer according to claim 1, characterized in that the stator comprises individual poles and that the electromagnetic poles with the associated pole windings are produced as identical parts.

8. The synchronous electromechanical transformer according to claim 7, characterized in that the pole cores are made of magnetically permeable material with anisotropic magnetic properties, preferably of grain-oriented electrical sheet, and in that the direction with ideal magnetic properties agrees with the direction of the magnetic field in the core shaft.

9. The synchronous electromechanical transformer according to claim 1, characterized in that permanent magnets are used as the magnetic poles, the magnets preferably being made of materials based on rare earths, that the rotor, with the exception of the magnetic poles, comprises no magnetically permeable or electrically conductive parts, that the magnetic poles are connected to each other by polymers, preferably such reinforced with fillers, and that the part of the rotor comprising the magnetic poles is connected to the shaft or the parts that serve the connection to the shaft by means of the same material.

10. The synchronous electromechanical transformer according to claim 1, characterized in that the number of electrical phases is two, three or four.

* * * * *